United States Patent
Berkovich (10) Patent No.: US 12,413,876 B2
(45) Date of Patent: Sep. 9, 2025

(54) MULTI-MODE SENSOR ASSEMBLY FOR LIGHT DETECTION

(71) Applicant: Meta Platforms Technologies, LLC, Menlo Park, CA (US)

(72) Inventor: Andrew Samuel Berkovich, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 117 days.

(21) Appl. No.: 18/518,216

(22) Filed: Nov. 22, 2023

(65) Prior Publication Data

US 2024/0214709 A1  Jun. 27, 2024

Related U.S. Application Data (60) Provisional application No. 63/434,159, filed on Dec. 21, 2022.

(51) Int. Cl.
*H04N 25/78* (2023.01)
*H04N 25/131* (2023.01)

(52) U.S. Cl.
CPC ........... *H04N 25/78* (2023.01); *H04N 25/131* (2023.01)

(58) Field of Classification Search
CPC .............................. H04N 25/78; H04N 25/131
USPC ..................................................... 348/207.99
See application file for complete search history.

(56) References Cited

U.S. PATENT DOCUMENTS

| | | | |
|---|---|---|---|
| 9,300,859 B2 * | 3/2016 | Ise | H04N 23/54 |
| 9,350,928 B2 * | 5/2016 | Keelan | H10F 39/811 |
| 9,746,376 B2 * | 8/2017 | Wein | G01J 3/2803 |
| 11,523,071 B1 * | 12/2022 | Powell | H04N 25/76 |
| 2006/0069532 A1 * | 3/2006 | Takei | G01J 5/16 |
| | | | 702/191 |
| 2012/0002092 A1 * | 1/2012 | Guidash | H04N 25/778 |
| | | | 348/308 |
| 2015/0296158 A1 * | 10/2015 | Mansoorian | H04N 25/76 |
| | | | 348/308 |
| 2016/0156869 A1 * | 6/2016 | Ise | H04N 23/54 |
| | | | 348/302 |
| 2019/0281234 A1 * | 9/2019 | Lin | H04N 23/20 |
| 2020/0065572 A1 * | 2/2020 | Roberts | H04N 25/443 |
| 2020/0092506 A1 * | 3/2020 | Park | H10F 39/811 |
| 2020/0124481 A1 * | 4/2020 | Forg | G01F 1/6888 |
| 2021/0281777 A1 * | 9/2021 | Watanabe | H04N 25/57 |
| 2022/0321817 A1 * | 10/2022 | Kim | H04N 25/672 |
| 2023/0179888 A1 * | 6/2023 | Sato | H04N 25/00 |
| | | | 348/207.99 |
| 2023/0397444 A1 * | 12/2023 | Negoro | H10B 80/00 |

\* cited by examiner

*Primary Examiner* — Usman A Khan (74) *Attorney, Agent, or Firm* — Freestone Intellectual Property Law PLLC; Aaron J. Visbeek (57) ABSTRACT

A multi-mode sensor assembly is described. The sensor assembly includes a first die and a second die. The first die includes a pixel array composed of color pixels that detect light in one or more color channels and sparse pixels. The color pixels and the sparse pixels are arranged to form macro pixels, and each macro pixel includes a respective subset of the color pixels and a respective subset of the sparse pixels. The second die is positioned below and coupled to the first die. The second die includes an analog-to-digital converter (ADC) array that is communicatively coupled to the sparse pixels such that each subset of the sparse pixels has a single corresponding ADC in the ADC array.

20 Claims, 8 Drawing Sheets

|   |   |   |   |
|---|---|---|---|
| Color Pixel 405 | Color Pixel 405 | Color Pixel 410 | Color Pixel 410 |
| Color Pixel 405 | Color Pixel 405 | Color Pixel 410 | Color Pixel 410 |
| Sparse Pixel 420 | Sparse Pixel 420 | Color Pixel 415 | Color Pixel 415 |
| Sparse Pixel 420 | Sparse Pixel 420 | Color Pixel 415 | Color Pixel 415 |

|   |   |   |   |
|---|---|---|---|
| Color Pixel 405 | Sparse Pixel 420 | Color Pixel 405 | Sparse Pixel 420 |
| Color Pixel 410 | Color Pixel 415 | Color Pixel 410 | Color Pixel 415 |
| Color Pixel 405 | Sparse Pixel 420 | Color Pixel 405 | Sparse Pixel 420 |
| Color Pixel 410 | Color Pixel 415 | Color Pixel 410 | Color Pixel 415 |

MULTI-MODE SENSOR ASSEMBLY FOR LIGHT DETECTION

CROSS-REFERENCE TO RELATED APPLICATIONS

This application claims the benefit of U.S. Provisional Application No. 63/434,159, filed Dec. 21, 2022, which is incorporated by reference in its entirety.

FIELD OF THE INVENTION

This disclosure relates generally to camera systems, and more specifically to multi-mode sensor assemblies for light detection.

BACKGROUND

Often vision systems rely on separate red-green-blue (RGB) sensors and depth sensors. The result is depth and RGB sensors capture different perspectives of the scene, a phenomenon called parallax. Applications relying on RGB data and depth data to estimate scene geometry, textures, and color struggle with occlusions or holes in captured data due to this perspective challenge. The result can be large visual or reconstruction artifacts.

Additionally, high-resolution RGB data can be important for photographic applications and generally for images used for human consumption (as opposed to machine perception). This can drive array size and sensor resolution towards multi-megapixel (MP) solutions (e.g., 12 MP, 16 MP). However, the small form factor constraints of augmented and/or virtual reality systems tends to drive pixel size to a sub-micron range. And high dynamic range (HDR) capture with high resolution RGB sensors is a challenging problem. Challenges with conventional approaches include, e.g., ghosting, motion artifacts, and reduction in spatial resolution. Moreover, conventional solutions generally trade off low-light performance and/or spatial resolution for dynamic range, specifically high-light performance.

SUMMARY

A multi-mode sensor assembly ("sensor assembly") is described. The sensor assembly may be part of an imaging device. The sensor assembly may operate in different modes (e.g., color imaging, depth determination, HDR imaging, etc.). Based on a mode of operation of the sensor assembly data, captured data may be used to, e.g., generate images (e.g., high resolution RGB image), generate HDR images, determine depth information describing the local area, or some combination thereof. The sensor assembly includes a first die and a second die. The first die and the second die may be stacked (e.g., the second die may be positioned below and coupled to the first die). The first die includes a pixel array composed of color pixels and sparse pixels. The color pixels may be, e.g., color pixels that are configured to detect light in one or more color channels (e.g., blue pixel, red pixel, green pixel). The sparse pixels are sparse pixels. The sparse pixels may be used to, e.g., collect depth data describing a local area of the imaging device, collect light intensity information to facilitate HDR imaging, etc. The color pixels and the sparse pixels may be arranged to form a plurality of macro pixels. One or more of the macro pixels may include a respective subset of the color pixels and a respective subset (e.g., one or more) of the sparse pixels. The second die includes an analog-to-digital converter (ADC) array that is communicatively coupled to the sparse pixels such that each subset of the sparse pixels has a single corresponding ADC in the ADC array. The color pixels may be configured to operate in a rolling shutter mode to capture data describing the local area. The sparse pixels may be configured to operate in, e.g., a global shutter mode, an individual shutter mode, etc. Data captured by the color pixels and/or data captured by the sparse pixels may be used to perform an action (e.g., generate an HDR image).

In some embodiments, a sensor assembly is described. The sensor assembly includes a first die and a second die. The first die includes a pixel array composed of color pixels that detect light (e.g., in one or more color channels) and sparse pixels (i.e., sparse pixels). The color pixels and the sparse pixels may be arranged to form a plurality of macro pixels. Each macro pixel includes a respective subset of the color pixels and a respective subset (e.g., one or more) of the sparse pixels. The second die may be positioned below the first die, and the second die may be coupled to the first die. The second die includes an ADC array that is communicatively coupled to the sparse pixels such that each subset of the sparse pixels has a single corresponding ADC in the ADC array.

In some embodiments an imaging device is described. The imaging device includes a sensor assembly that includes a first die and a second die, and a controller. The first die includes a pixel array composed of color pixels (e.g., that detect light in one or more color channels) and sparse pixels (i.e., sparse pixels). The color pixels and the sparse pixels are arranged to form a plurality of macro pixels. Each macro pixel may include a respective subset of the color pixels and a respective subset of the sparse pixels. The second die may be positioned below the first die, and the second die may be coupled to the first die. The second die includes an ADC array that is communicatively coupled to the sparse pixels such that each subset of the sparse pixels has a single corresponding ADC in the ADC array. The controller is configured to instruct the sensor assembly to capture first data describing a local area using the color pixels and to capture second data describing the local area using the sparse pixels. The controller is configured to perform an action using the first data and the second data.

In some embodiments, a non-transitory computer-readable storage medium is described. The non-transitory computer-readable storage medium comprises stored instructions. The instructions, when executed by a processor of an imaging device, cause the imaging device to capture first data describing a local area using color pixels on a sensor assembly. The color pixels detect light in one or more color channels. The instructions further cause the imaging device to capture second data describing the local area using sparse pixels on the sensor assembly. The sensor assembly includes a first die that includes a pixel array composed of the color pixels and the sparse pixels. The color pixels and the sparse pixels are arranged to form a plurality of macro pixels, and each macro pixel includes a respective subset of the color pixels and a respective subset of the sparse pixels. The second die may be positioned below the first die and may be coupled to the first die. The second die includes an ADC array that is communicatively coupled to the sparse pixels such that each subset of the one or more sparse pixels has a single corresponding ADC in the ADC array. The instructions further cause the imaging device to perform an action using the first data and the second data.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A multi-mode sensor assembly ("sensor assembly") is described. The sensor assembly may be part of an imaging device (e.g., an imaging device that is integrated into an artificial reality device). The sensor assembly includes a first die and a second die. The first die and the second die may be stacked such that the second die is positioned below the first die. A first die includes a pixel array composed of color pixels and sparse pixels. And the second die includes an ADC array.

The color pixels are color pixels that are configured to detect light in one or more color channels (e.g., blue pixel, red pixel, green pixel). For example, the color pixels may include some pixels in a first color channel (e.g., red), some pixels in a second color channel (e.g., green), and some pixels in a third color channel (e.g., blue).

The sparse pixels are sparse pixels. Sparse pixels are sparse in number relative to a number of the color pixels, and also can operate in a global shutter mode, an individual shutter mode, or some combination thereof. In contrast, the color pixels all operate in a rolling shutter mode. The sparse pixels may be used to, e.g., collect depth data describing a local area of the imaging device, collect light intensity information to facilitate HDR imaging, etc.

The color pixels and the sparse pixels may be arranged to form a plurality of macro pixels. One or more of the macro pixels may include a respective subset of the color pixels and a respective subset the sparse pixels. Note, for a given macro pixel, the subset of color pixels is much larger than the subset of the sparse pixels (e.g., 1 sparse pixel for every 16 color pixels).

The ADC array is on the second die and is communicatively coupled to the sparse pixels such that each subset of the sparse pixels has a single corresponding ADC in the ADC array. In this manner, e.g., each macro pixel has its own dedicated ADC to handle information collected from its one or more sparse pixels. In contrast, data from the color pixels is read out to a subdivision ADC array (e.g., on the second die). The subdivision ADC array may be positioned adjacent to the ADC array. The subdivision ADC array includes a plurality of ADCs that are communicatively coupled to different subdivisions (e.g., columns) of the color pixels and data from the subdivisions of color pixels may be read out in a rolling shutter mode.

The sensor assembly may operate in different modes. Modes may include, e.g., color imaging, depth determination, HDR imaging, or some combination thereof. Based on a mode of operation of the sensor assembly, data captured by the color pixels and data captured by the sparse pixels may be used to, e.g., generate images (e.g., high resolution RGB image), generate HDR images, determine depth information describing the local area, or some combination thereof.

Note that conventional systems often separate their color imaging system (e.g., RGB sensor) and their depth sensor, but as described above, this leads to parallax and can cause other issues (e.g., missing data due to different viewpoints of the RGB sensor and the depth sensor). In contrast, the sensor assembly described herein has a pixel array that has color pixels with sparse pixels (e.g., may be used to collect depth data) integrated throughout, thereby, mitigating the parallax problems of conventional systems.

Moreover, the sensor assembly is able to maintain a small form factor with an integrated pixel array of color pixels and sparse pixels that can be of high resolution (e.g., sub-micron pixel size). The color pixels operate in a rolling shutter mode and may be relatively small. Thereby, the sensor assembly may have a large number of the color pixels in the pixel array (e.g., for high resolution image capture). And while a circuit of an individual sparse pixel is larger (e.g., dedicated ADC and memory) than a circuit for a color pixel, because the sparse pixels are relatively few in number their impact on form factor is greatly reduced.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
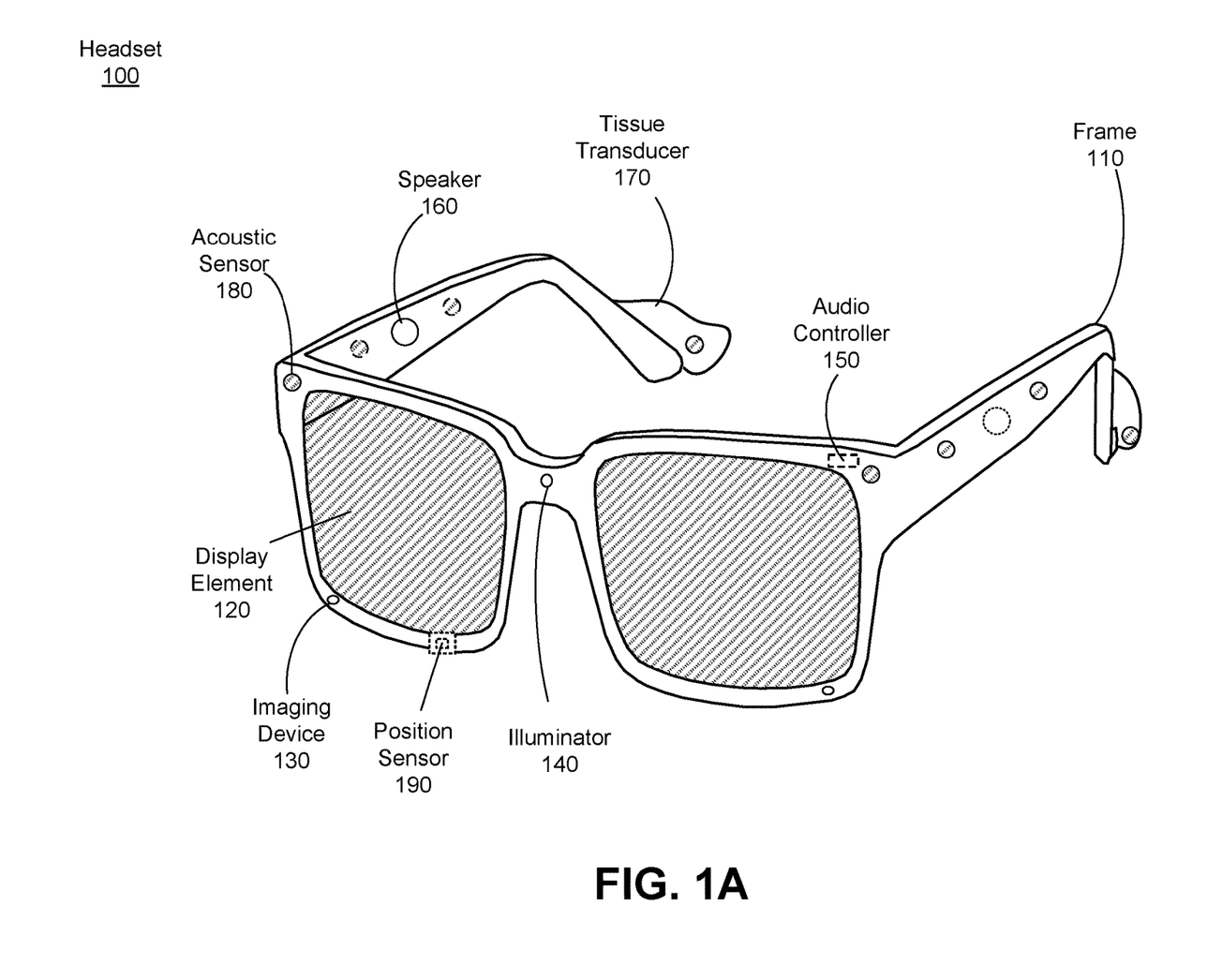
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal, trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a controller (not shown in FIG. 1A), and the DCA may also include an illuminator 140. In some embodiments, the illuminator 140 illuminates a portion of the local area with light. The light may be, e.g., structured light (e.g., dot pattern, bars, etc.) in the infrared (IR) spectrum, IR flash for time-of-flight (ToF), etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The one or more imaging devices 130 are configured to capture information (e.g., images and/or depth data) about a local area of the headset 100. An imaging device 130 includes an optical assembly and a multi-mode sensor assembly. In some embodiments, the imaging device 130 may also include the controller. The controller may control the multi-mode sensor assembly to operate in various modes (e.g., color imaging, depth determination, HDR imaging, or some combination thereof).

The controller may compute depth information for the portion of the local area using the captured data (e.g., from the color pixels and/or the sparse pixels) and one or more depth determination techniques. The depth determination technique may be, e.g., direct time-of-flight (dToF) depth sensing, indirect time-of-flight (iToF) depth sensing, structured light, passive stereo analysis, active stereo analysis (uses texture added to the scene by light from the illuminator 140), some other technique to determine depth of a scene, or some combination thereof. The imaging device 130 and multi-mode sensor assembly are described in detail below with regard to, e.g., FIGS. 2-7.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
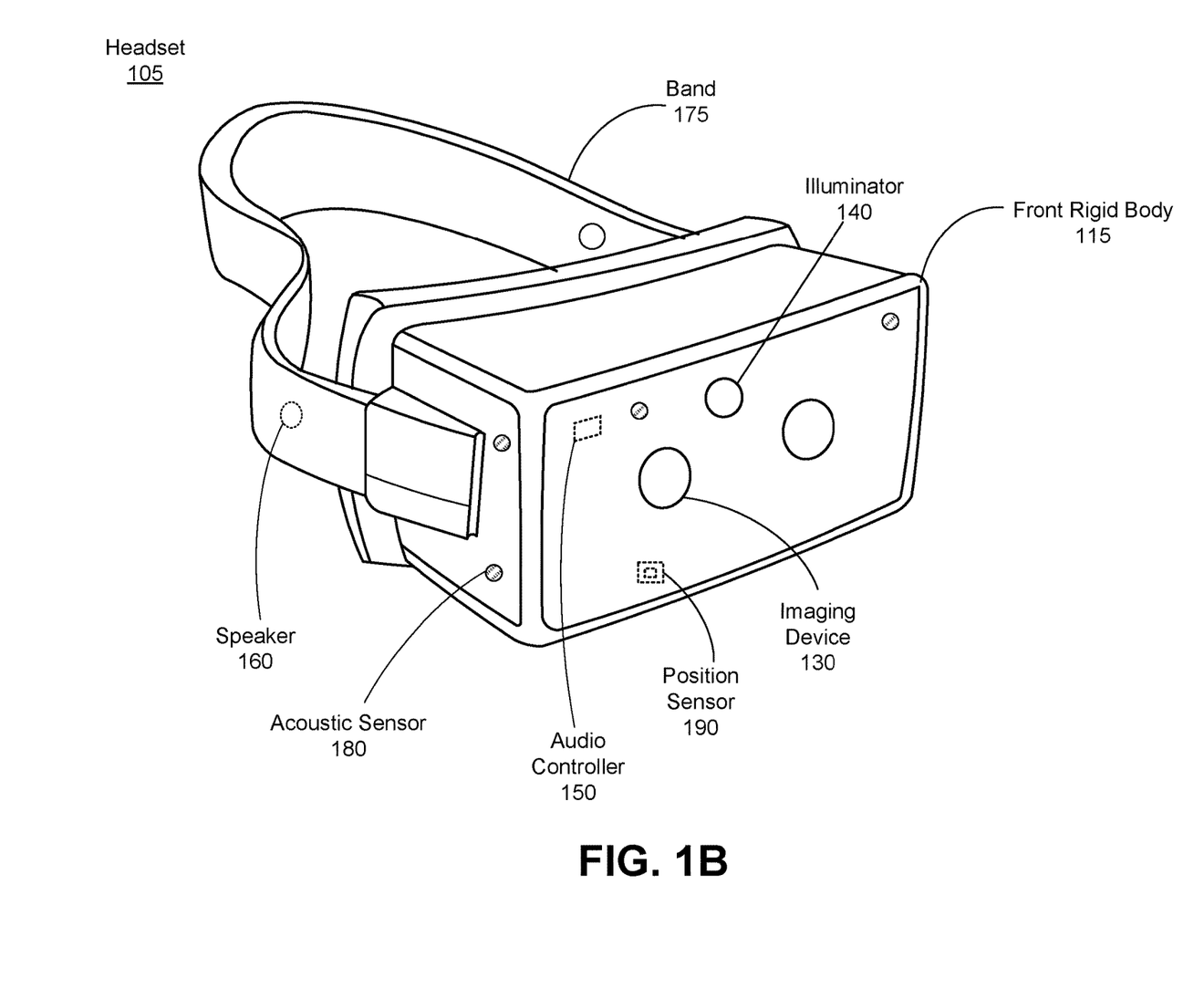
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
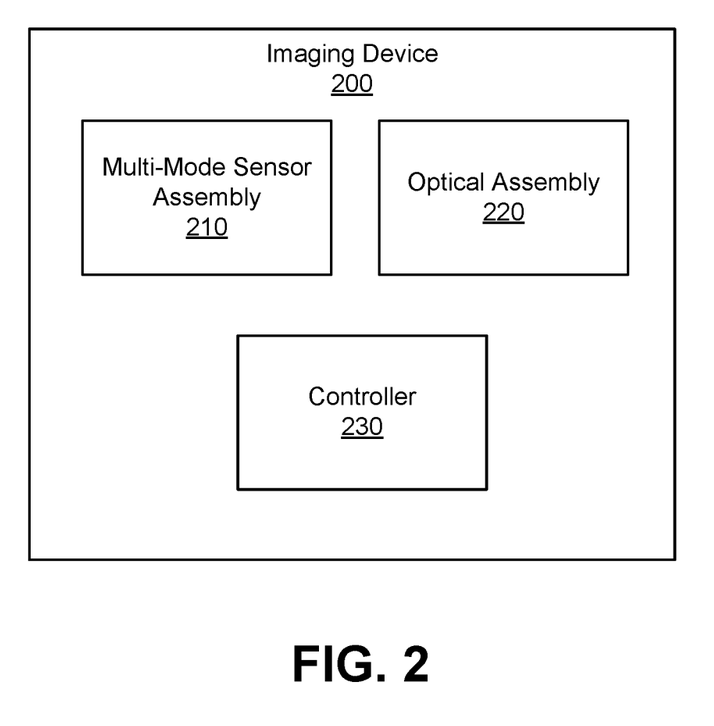
FIG. 2 is an example block diagram of an imaging device that includes a multi-mode sensor assembly, according to one or more embodiments.

FIG. 2 is an example block diagram of an imaging device 200 that includes a multi-mode sensor assembly 210, according to one or more embodiments. The imaging device 130 is an embodiment of the imaging device 200. The imaging device 200 includes the multi-mode sensor assembly 210, an optical assembly 220, and a controller 230. Some embodiments of the imaging device 200 have different components than those described herein. Similarly, in some cases, functions can be distributed among the components in a different manner than is described herein. As shown, the imaging device 200 includes a controller 230 that controls the imaging device 200. In other embodiments, the controller 230 may be part of the device (e.g., headset) in which the imaging device is integrated.

The optical assembly 220 focuses light from a local area of the imaging device 200 onto the multi-mode sensor assembly 210. The optical assembly 220 may include one or more optical elements (e.g., lens, aperture, filters, etc.). The optical assembly 220 may further include a lens barrel. The one or more optical elements are positioned in optical series (i.e., arranged such that light passes sequentially through the optical elements one optical element at a time) with each other and the multi-mode sensor assembly 210.

The multi-mode sensor assembly 210 is a sensor that may operate in multiple modes. Modes may include, e.g., color imaging, depth determination, HDR imaging, or some combination thereof. The multi-mode sensor assembly 210 includes a pixel array, an ADC array, a subdivision ADC array, and various connection pathways.

The pixel array is configured to detect light received from the optical assembly 220. The pixel array is composed of two different types of pixels, specifically, color pixels and sparse pixels. A total number of the color pixels is much greater than a total number of the sparse pixels. The sparse pixels are distributed among the color pixels. For example, in some embodiments, for every 4×4 block of pixels, there are 12 color pixels and at most 4 sparse pixels.

The color pixels are configured to capture data describing the local area in one or more color channels. Each color channel is associated with a corresponding optical range of wavelengths. In this manner, the one or more color channels may include, e.g., red, green, blue, etc. In some embodiments, the color pixels include pixels of different color channels (e.g., some red pixels, some blue pixels, some green pixels). In other embodiments, the color pixels are all of the same color channel.

The sparse pixels are configured to capture data describing the local area. The sparse pixels may be used to, e.g., collect depth data describing a local area of the imaging device, collect light intensity information to facilitate HDR imaging, etc. The sparse pixels are configured to detect light over a range of optical wavelengths. The range of optical wavelengths may, e.g., be an optical range of wavelengths that corresponds to an optical band (e.g., infrared spectrum) of an illuminator (e.g., the illuminator 140), an extended optical range of wavelengths that includes each of the optical range of wavelengths of the one or more color channels of the color pixels, an extended optical range of wavelengths that includes each of the optical range of wavelengths of the one or more color channels of the color pixels and a range of optical wavelengths of the illuminator, a narrow band optical range of wavelengths (e.g., in the infrared spectrum), some other range of optical wavelengths, etc.

The color pixels and the sparse pixels may be arranged in the pixel array to form a plurality of macro pixels. A macro pixel is a grouping of pixels of the pixel array. In some embodiments, a macro pixel is a X×Y block of pixels, where X and Y are integers. In some embodiments, X and Y have a same value. For example, X and Y may be 4, resulting in a macro pixel being formed from 16 pixels. Also in some embodiments, at least one macro pixel is a different size than another macro pixel. In some embodiments, each macro pixel includes a respective subset of the color pixels and a respective subset the sparse pixels. Note, for a given macro pixel, the subset of color pixels is much larger than the subset of the sparse pixels (e.g., in a 4×4 block macro pixel there is 1 sparse pixel and 15 color pixels). In embodiments, where a macro pixel includes a plurality of sparse pixels, the data collected by the plurality of sparse pixels within the macro pixel may be combined (e.g., via charge-domain binning and/or voltage-domain binning) such that the plurality of sparse pixels corresponds to a single sparse pixel with a larger detection area. Each sparse pixel has a detection area, similarly, each color pixel has its own detection area. In some embodiments, the size of a detection area for a sparse pixel is the same size as the detection area of the color pixel. In other embodiments, the size of the detection area of the sparse pixel is different from the size of the detection area of the color pixel. For example, the detection area of a sparse pixel may be larger than a detection area of a color pixel.

The ADC array is communicatively coupled to the sparse pixels such that each subset of the sparse pixels has a single corresponding ADC in the ADC array. In this manner, e.g., each macro pixel has its own dedicated ADC to handle data collected from its one or more sparse pixels. In some embodiments, each ADC in the ADC array is coupled to a respective local memory element. In other embodiments, each ADC in the ADC array is coupled to a respective portion of a single memory element. And in some embodiments (e.g., to support depth estimation), some or all of the ADCs in the ADC array are also coupled to respective amplifiers, peak detection circuits, or both. The one or more sparse pixels of a macro pixel, the corresponding ADC, coupling pathways, the corresponding memory element, and optionally the corresponding amplifier and/or peak detection circuit, collectively may be referred to as a digital pixel system (DPS). In some embodiments, a DPS may use an integrating pixel front-end or a regulated pixel front end.

The subdivision ADC array is communicatively coupled to each of the subdivisions of the color pixels. For example, the color pixels may be subdivided into a plurality of subdivisions (columns, rows, etc.), where each subdivision can be read out in rolling shutter mode. The subdivision ADC may be positioned adjacent to the ADC array.

The color pixels operate in a rolling shutter mode (data is captured by scanning across different subdivisions (e.g., column by column) of the color pixels). The one or more sparse pixels of a single macro pixel have a same exposure mode, but the exposure mode may be the same or different for sparse pixels in other macro pixels. For example, the sparse pixels in each macro pixel may operate in a global exposure mode. In another example, in the case where there is only a single sparse pixel in each macro pixel—the sparse pixels can each operate in an individual exposure mode. Individual exposure mode allows independent control of the exposure of each of the sparse pixels. In this manner, the sparse pixels may also be configured to operate in a global shutter mode (all are active over a same exposure window).

Note that the readout of the sparse pixels relies on a circuit that is separate and independent from a circuit that that handles readout for the color pixels. Accordingly, readout of the data captured by the color pixels and readout of the data captured by sparse pixels may occur at the same time or in a serial manner. In some embodiments, readout of data from the color pixels and readout of data from the sparse pixels may be over a single channel (e.g., Mobile Industry Processor Interface channel) using, e.g., virtual channels or interleaving techniques. In some embodiments, data from the sparse pixels may be added to the data readout from the color pixels to readout a single full-frame image.

The controller 230 is configured to control the imaging device 200. The controller 230 determines an operational mode, from a plurality of operational modes, for the multi-mode sensor assembly 210. The operational modes may be based in part on how the multi-mode sensor assembly 210 is configured (e.g., what optical ranges of wavelengths the color pixels and the sparse pixels are configured to detect). The plurality of operational modes may include, e.g., color imaging, depth determination, HDR imaging, or some combination thereof. The controller 230 instructs the multi-mode sensor assembly 210 to collect data in accordance with the determined operational mode. For example, the controller 230 may instruct, e.g., some or all of the color pixels, some or all of the sparse pixels to capture data describing the local area.

The controller 230 may perform an action using the captured data from the color pixels, the captured data from the sparse pixels, or some combination thereof. The action may be to, e.g., generate an image using the captured data from the color pixels. For example, the controller 230 may identify holes in the data from the color pixels associated resulting from the sparse pixels. The controller 230 may, e.g., interpolate neighboring pixel data to generate data to fill the identified holes, and update the captured data accordingly. In embodiments, where a color pixel has saturated, the controller 230 may use, e.g., data from adjacent sparse pixels (e.g., in a same macro pixel) that have not saturated to estimate a non-saturated value for the data color pixel, and update the data associated with the color-pixel to be the estimated value. In this manner, the controller 230 is able to generate an HDR image. In another embodiment, the controller 230 may use the data captured from the sparse pixels and a depth determination methodology (e.g., ToF, etc.) to e.g., determine depth information for some or all of the local area.

Figure 3:
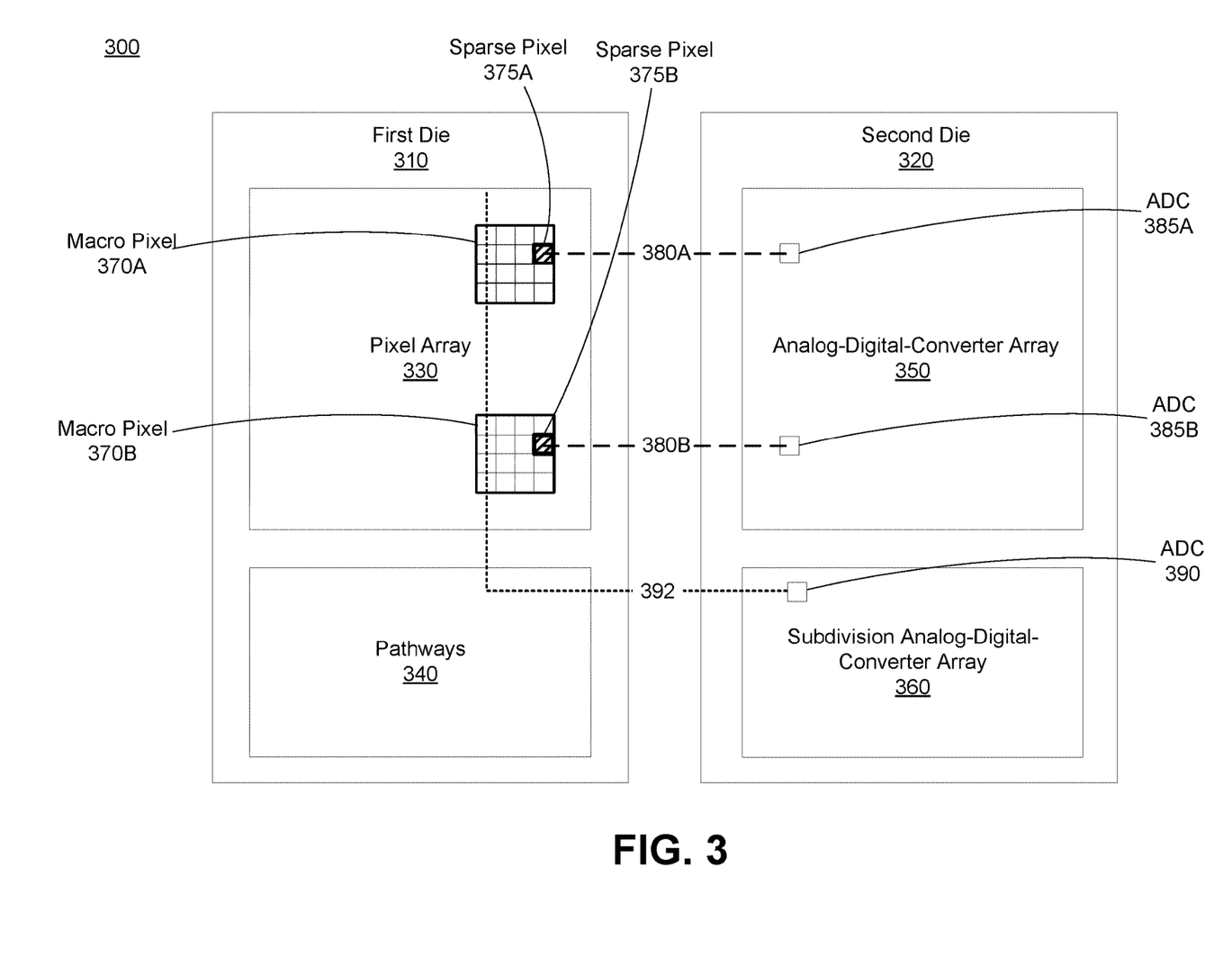
FIG. 3 is an example block diagram of a multi-mode sensor assembly for light detection, in accordance with one or more embodiments.

FIG. 3 is an example block diagram of a multi-mode sensor assembly 300 for light detection, in accordance with one or more embodiments. The multi-mode sensor assembly 300 is an embodiment of the multi-mode sensor assembly 210. The multi-mode sensor assembly 300 includes a first die 310 and a second die 320. The first die 310 may be positioned above and coupled to the second die 320 such that the dies are stacked. The first die 310 includes a pixel array 330 and pathways 340. And the second die 320 includes an ADC array 350, and a subdivision ADC array 360. In some embodiments, the second die 320 may also include one or more memory elements that are coupled to the ADC array 350, and one or more memory elements that are coupled to the subdivision ADC array 360. Some embodiments of the multi-mode sensor assembly 210 have different components than those described here. Similarly, in some cases, functions can be distributed among the components in a different manner than is described here.

The pixel array 330 is configured to detect light (e.g., received from the optical assembly 220). The pixel array 330 is an embodiment of the pixel array described above with regard to FIG. 2. The pixel array 330 is an array of N×M pixels, where N and M are integers. The pixel array 330 is composed of color pixels and sparse pixels that are distributed among the color pixels to form the N×M array. The color pixels and the sparse pixels are arranged to form a plurality of macro pixels. For example, FIG. 3 shows a portion of the pixel array 330 that includes a macro pixel 370A and a macro pixel 370B of the plurality of macro pixels. As shown the macro pixel 370A and the macro pixel 370B are each 4×4 blocks of pixels that include 15 color pixels of one or more color channels and a single sparse pixel (e.g., sparse pixel 375A and sparse pixel 375B).

The ADC array 350 is an embodiment of the ADC array described above with regard to FIG. 2. The ADC array 350 is communicatively coupled to the sparse pixels in the plurality of macro pixels such that each subset of the sparse pixels has a single corresponding ADC in the ADC array 350. The sparse pixels may be couped to corresponding ADCs via pathways (e.g., vias, traces, pads, etc.). For example, the sparse pixel 375A is communicatively coupled via a pathway 380A to a dedicated ADC 385A in the ADC array 350, and the sparse pixel 375B is communicatively coupled via a pathway 380B to a dedicated ADC 385B in the ADC array 350. The pathways are electrically conductive (e.g., copper, aluminum, gold, etc.) and may include one or more vias that couple sparse pixels on a top surface of the first die 310 to a bottom surface of the first die 310, where they then couple to a top surface of the second die 320 and ultimately the ADCs of the ADC array 350.

In some embodiments (not shown), each ADC in the ADC array 350 is coupled to a respective local memory element or a portion of a single memory element. The local memory element(s) may be, e.g., integrated within the ADC array 350 (e.g., each ADC is directly coupled to its own memory element within the ADC array 350), on a bottom side of the second die 320 (e.g., coupled to their corresponding ADCs using one or more vias), or some combination thereof. In some embodiments, some or all of the ADCs in the ADC array 350 are also coupled to respective amplifiers, peak detection circuits, or both.

The subdivision ADC array 360 is communicatively coupled to different subdivisions (e.g., columns) of the color pixels in the pixel array 330 via pathways 340. The subdivision ADC array 360 includes an ADC for each subdivision that handles data for that subdivision. The pathways 340 include vias, traces, pads, etc., that electrically connect subdivisions of the color pixels in the pixel array 330 to corresponding ADCs in the subdivision ADC array 360. Note that data captured by the color pixels of the pixel array 330 is configured to be read out in a rolling shutter mode. In the illustrated embodiments, the color pixels are subdivided into a plurality of columns, and data from each column is passed using the pathways 340 to the subdivision ADC array 360. In some embodiments, a column of color pixels may span some or all of the entire pixel array 330. For example, it may include multiple macro pixels in a single read out. In some embodiment, data captured by a subdivision of the color pixels is transmitted to a periphery of the pixel array (e.g., via traces) and is transmitted to a bottom side of the first die 310 using one or more vias, where they couple to a top surface of the second die 320 and ultimately a corresponding ADC of the subdivision ADC array 360. For example, as shown the color pixels in the first columns of the macro pixels 370A, 370B are coupled to an ADC 390 in the subdivision ADC array 360 via a pathway 392 of the pathways 340.

Figure 4A:
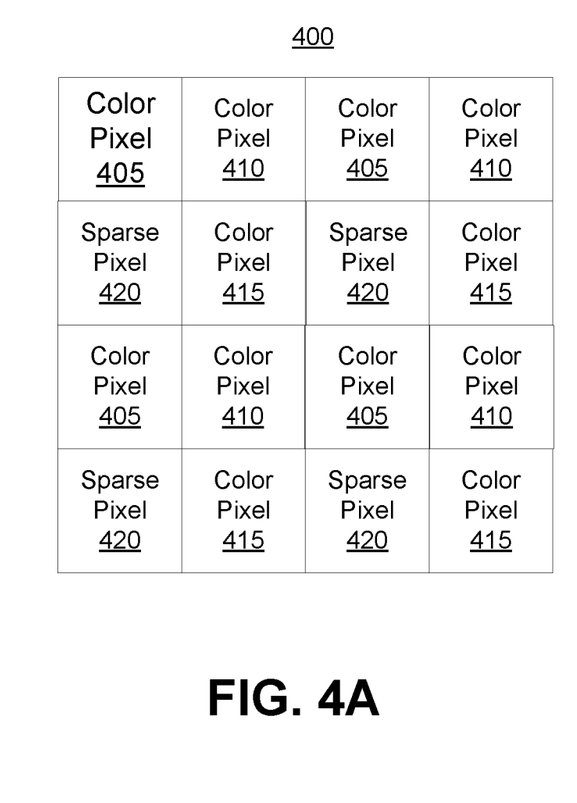
FIG. 4A is an example macro pixel with interleaved pixels, in accordance with one or more embodiments.

FIG. 4A is an example macro pixel 400 with interleaved pixels, in accordance with one or more embodiments. The macro pixel 400 is formed from pixels on a multi-mode sensor assembly (e.g., the multi-mode sensor assembly 210). In the illustrated embodiment, the macro pixel 400 is a 4×4 block, that includes twelve color pixels and four sparse pixels 420. The twelve color pixels include color pixels 405, color pixels 410, and color pixels 415, that are each configured to detect light in different color channels. In the illustrated example, each of the sparse pixels 420 are separated from adjacent sparse pixels 420 by one color pixel, and the color pixels of a particular color channel (e.g., color pixel 415) are separated from other color pixels of the same color channel by at least one sparse pixel 420 or a color pixel of a different color channel (e.g., color pixel 410).

Note that there are multiple sparse pixels 420 in the macro pixel 400. In some embodiments, all of the sparse pixels 420 are communicatively coupled to a same ADC in an ADC array (e.g., the ADC array 350). The data collected by the four sparse pixels 420 may be combined (e.g., via charge-domain binning and/or voltage-domain binning) such that the four sparse pixels 420 appears as a single sparse pixel with a detection area that is larger than a single sparse pixel 420. In some embodiments, voltage binning occurs in the ADC array 350 prior to quantization.

Figure 4B:
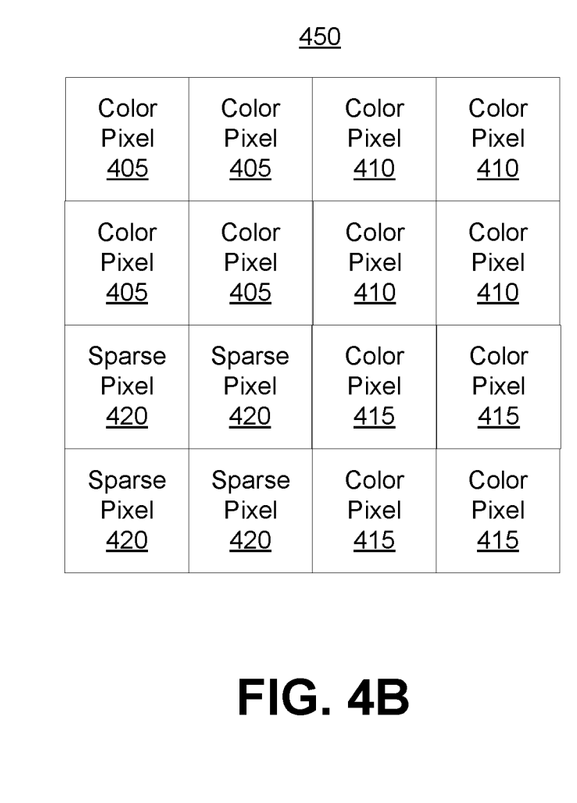
FIG. 4B is an example macro pixel with grouped pixels, in accordance with one or more embodiments.

FIG. 4B is an example macro pixel 450 with grouped pixels, in accordance with one or more embodiments. The macro pixel 450 is substantially the same as the macro pixel 400 except that the pixels are arranged differently. The twelve color pixels include color pixels 405, color pixels 410, and color pixels 415, that are each configured to detect light in different color channels. In the illustrated example, pixels of a same color channel are directly adjacent to each other, and the four sparse pixels 420 are directly adjacent to each other.

Figure 5A:
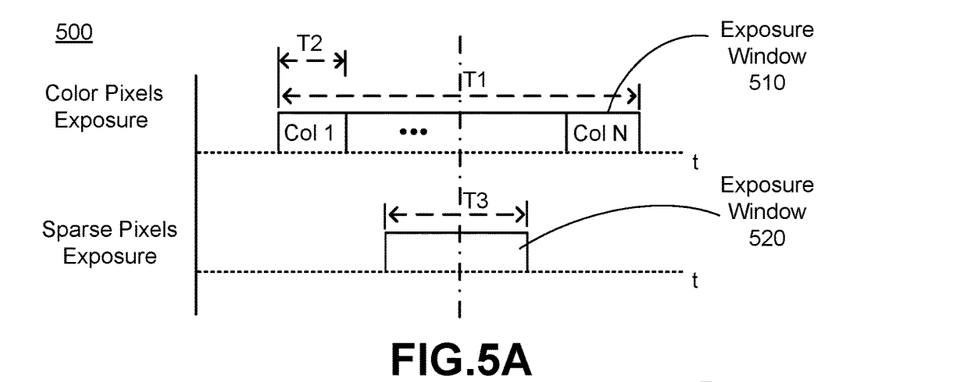
FIG. 5A is an example timing diagram for color pixels in a rolling shutter mode and sparse pixels in a global shutter mode, in accordance with one or more embodiments.

FIG. 5A is an example timing diagram 500 for color pixels in a rolling shutter mode and sparse pixels in a global shutter mode, in accordance with one or more embodiments. The timing diagram 500 includes an exposure window 510 and an exposure window 520.

The exposure window 510 is an exposure window for the subdivisions of the color pixels operating in a rolling shutter mode. The exposure window 510 operates over a time range T1, but the actual exposure of each subdivision of color pixels operates over a smaller time range (e.g., T2). For example, in FIG. 5A the color pixels are subdivided into N columns, where N is an integer, and each column is exposed for T2.

The exposure window 520 is an exposure window for the sparse pixels that are operating in a global shutter mode. The exposure window operates over a time range T3. In FIG. 5A T3 is less than T1. But in other embodiments, T3 may have some other value. For example, T3 may be equal to T1, T3 may be greater than T1, less than T2, etc. As shown the exposure window 510 and the exposure window 520 are centered on a same time value.

Note that in a global shutter mode all of the sparse pixels are exposed over the entire time range T3. And in FIG. 5A as T3 is longer than T2, this can be helpful in, e.g., low light situations where T2 is too short to gather enough signal and the sparse pixels are configured to detect light in at least some of the color channels of the color pixels. The longer exposure range of the sparse signals may be used to gather signal to compensate for the underexposed color pixels, while T2 can be kept relatively short to help mitigate artifacts caused by motion of objects in the local area and/or of the imaging device.

As shown the exposure window 510 and the exposure window 520 are centered on a same time value. However, a controller may instruct the multi-mode sensor to trigger the exposure windows at other times.

Figure 5B:
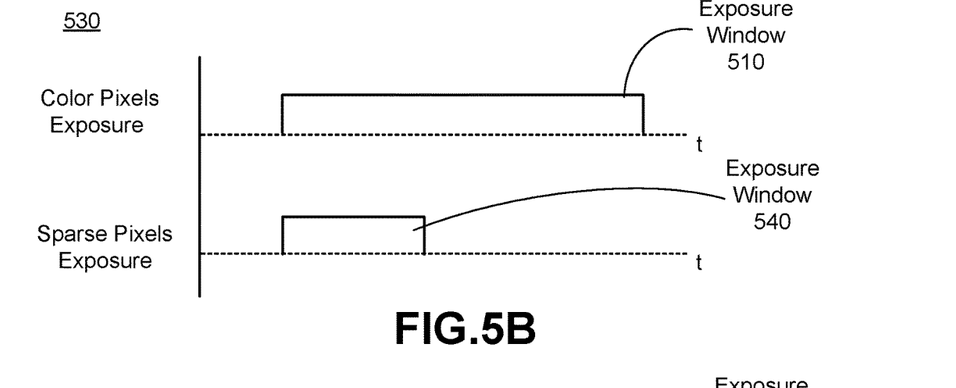
FIG. 5B is another example timing diagram for color pixels in a rolling shutter mode and sparse pixels in a global shutter mode, in accordance with one or more embodiments.

For example, FIG. 5B is another example timing diagram 530 showing color pixels in a rolling shutter mode and sparse pixels in a global shutter mode, in accordance with one or more embodiments. The timing diagram is substantially the same as the timing diagram 500, except that an exposure window 540 for the sparse pixels and the exposure window 510 begin at a same time value, but end on different time values. In another example (not shown), an exposure window for the sparse pixels and the exposure window 510 may end on a same time value, but begin on different time values.

Figure 5C:
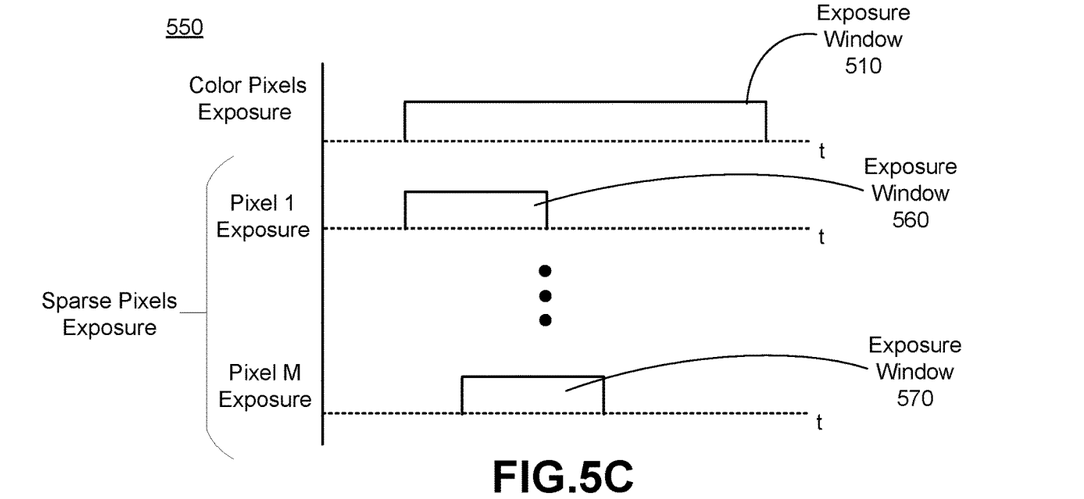
FIG. 5C is an example timing diagram for color pixels in a rolling shutter mode and sparse pixels in an individual shutter mode, in accordance with one or more embodiments.

FIG. 5C is an example timing diagram 550 showing color pixels in a rolling shutter mode and sparse pixels in an individual shutter mode, in accordance with one or more embodiments. In this example, the sparse pixels are each in an individual shutter mode. In an individual shutter mode, each sparse pixel is exposed independent from each other, such that each sparse pixel has an exposure window whose length and start time can be set independent from other smart pixels. This may be useful, e.g., in reducing noise in depth data determining using time of flight methodologies. For example, sparse pixels that general correspond to objects that are close to the multi-mode sensor assembly can have different exposure windows (e.g., start time, length of time, etc.) than sparse pixels that correspond to objects that are farther away. Or in another example, for imaging and/or HDR imaging applications, sparse pixels that correspond to objects that have caused clipping in the data from the color pixels can adjust their exposure windows to help compensate for the clipping.

Figure 6:
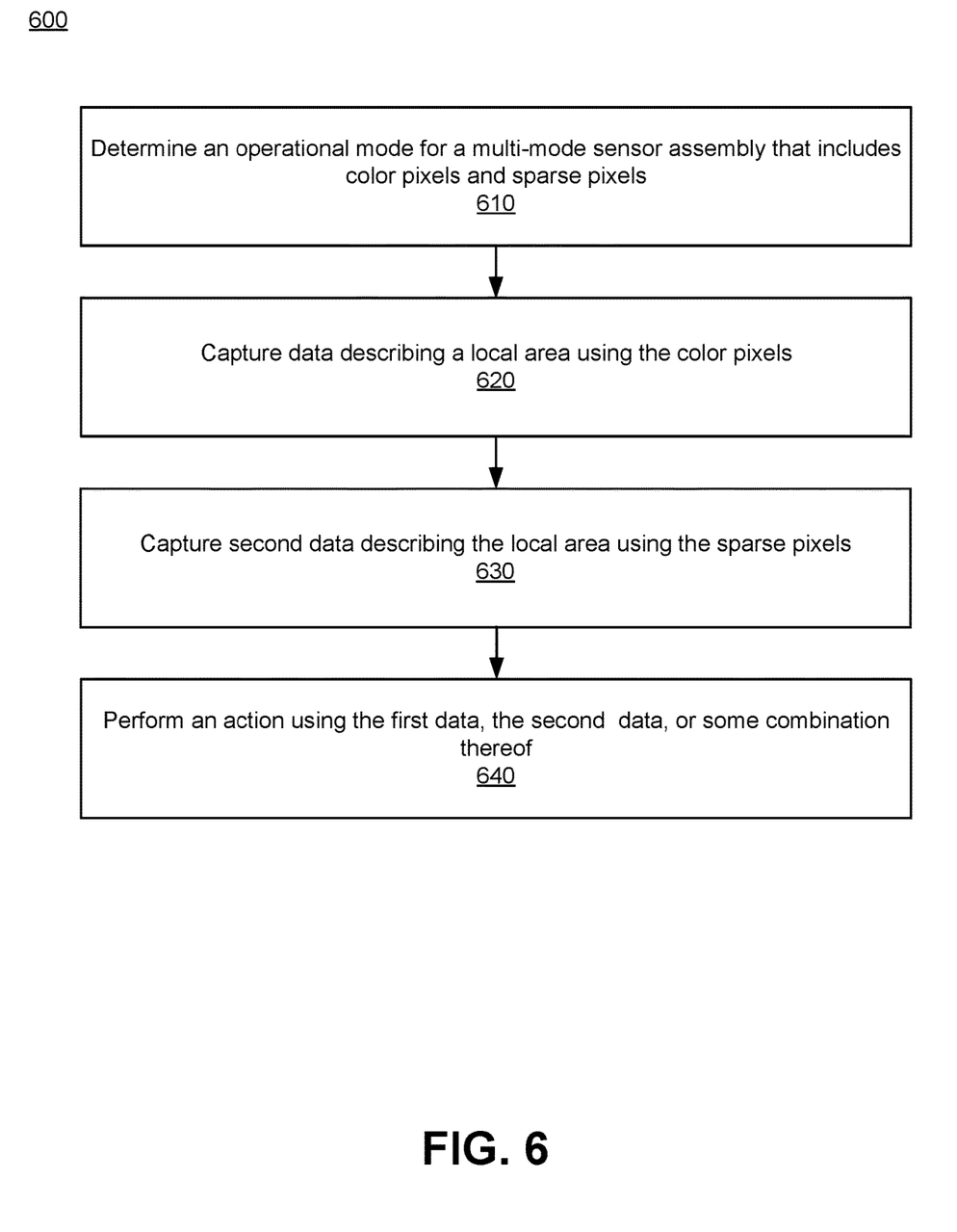
FIG. 6 is a flowchart illustrating a process for generating an image using a multi-mode sensor assembly, in accordance with one or more embodiments.

FIG. 6 is a flowchart illustrating a process 600 for generating an image using a multi-mode sensor assembly, in accordance with one or more embodiments. The process 600 shown in FIG. 6 may be performed by components of an imaging device (e.g., the imaging device 200). Other entities may perform some or all of the steps in FIG. 6 in other embodiments. Embodiments may include different and/or additional steps, or perform the steps in different orders.

The imaging device determines 610 an operational mode for a multi-mode sensor assembly (e.g., the multi-mode sensor assembly 210) that includes color pixels and sparse pixels. The imagining device may determine the operational mode using a controller (e.g., the controller 230). The imaging devices determines an operational mode, from a plurality of operational modes (e.g., color imaging, depth determination, HDR imaging, or some combination thereof), for the multi-mode sensor assembly. In some embodiments, the imaging device determines the operational mode responsive to a selection by a user of the operational mode. In other embodiments, the controller may select an operational mode based on, e.g., lighting conditions of the local area. For example, if the lighting of the local area has a larger dynamic range than that of the color pixels, the imaging device may select an HDR imaging mode. In another embodiment, the imaging device may receive instructions to determine depth information for the local area, and determine the operational mode to be depth determination.

The imaging device captures 620 data describing a local area using the color pixels. The imaging device captures the data using the color pixels in accordance with instructions from the controller. The captured data is read out in a rolling shutter mode.

The imaging device captures 630 second data describing the local area using the sparse pixels. The imaging device captures the data using the sparse pixels in accordance with instructions from the controller. In some embodiments the exposure windows (e.g., the exposure window 510 and the exposure window 520) for 620 and 630 overlap. The imaging device may use the sparse pixels in, e.g., an individual shutter mode, a global shutter mode, etc.

The imaging device performs 640 an action using the first data, the second data, or some combination thereof. The action may be, e.g., generating an image using the first data, generating an HDR image using the first data and the second data, generating depth information using the second data, some other action that uses one or both of the first data and the second data, or some combination thereof.

Figure 7:
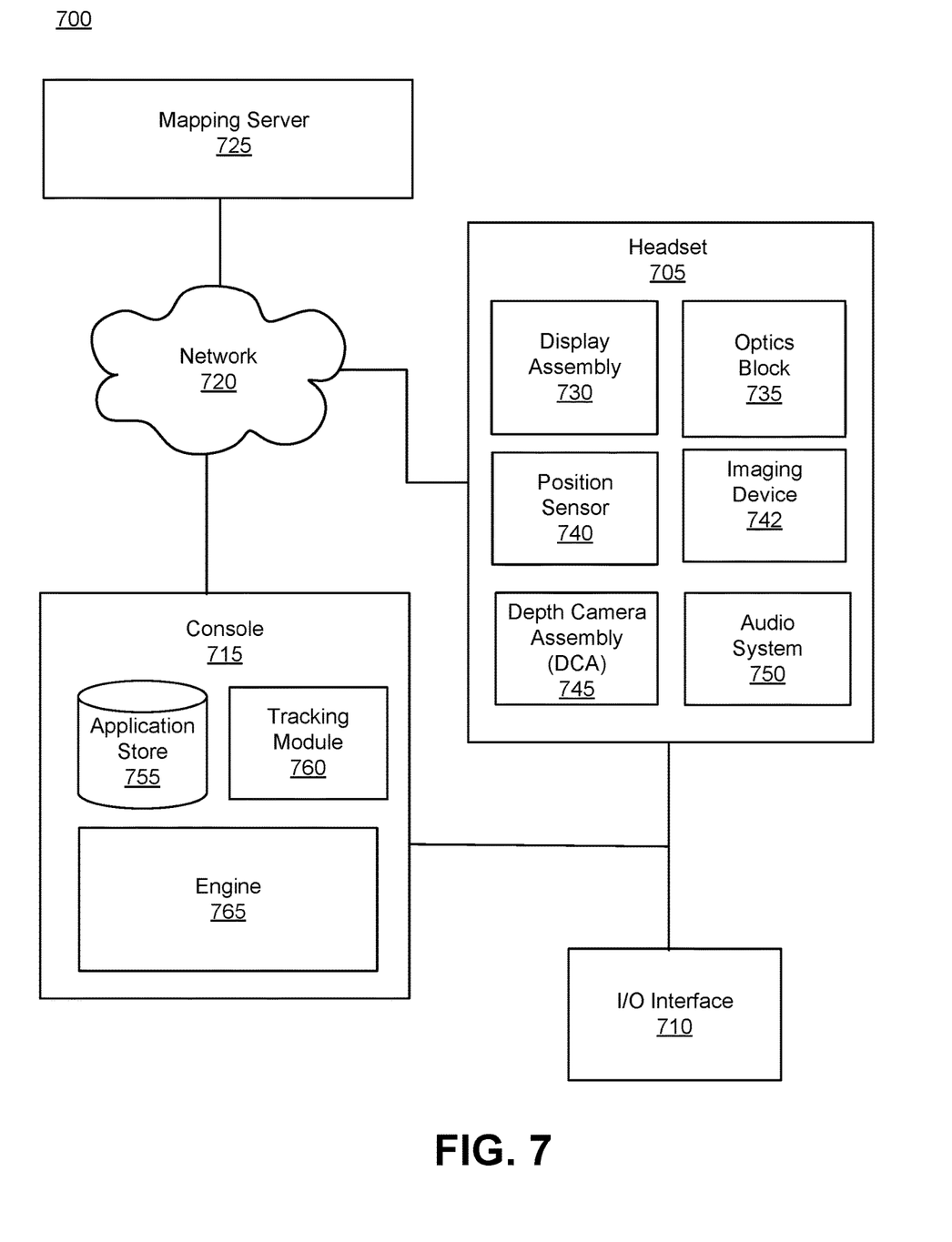
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, one or more imaging devices 742, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The one or more imaging devices 742 are configured to capture data from a local area of the headset 705. The one or more imaging devices 742 are embodiments of the imaging device described above with reference to, e.g., FIGS. 1A trough 6. The imaging device 742 includes a multi-mode sensor assembly that includes color pixels as well as sparse pixels that are distributed among the color pixels. The sparse pixels may be used to collect, e.g., depth data about the local area. The multi-mode sensor assembly of the imaging device 742 may operate in different modes. Modes may include, e.g., color imaging, depth determination, HDR imaging, or some combination thereof. Based on a mode of operation of the multi-mode sensor assembly of the imaging device 742, data captured by the color pixels and data captured by the sparse pixels may be used to, e.g., generate images (e.g., high resolution RGB image), generate HDR images, determine depth information describing the local area, or some combination thereof.

The DCA 745 generates depth information for a portion of the local area. The DCA 745 includes one or more imaging devices 742 and a DCA controller. The DCA 745 may also include an illuminator. In some embodiments, the DCA controller may include the functionality of controllers of the one or more imaging devices 742. Operation and structure of the DCA 745 is described above with regard to FIG. 1A.

The audio system 750 provides audio content to a user of the headset 705. The audio system 750 is substantially the same as the audio system describe above with regard to FIG. 1A. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, a head-related transfer function (HRTF) for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A sensor assembly comprising:
a first die including a pixel array composed of color pixels that detect light in one or more color channels and sparse pixels, wherein the color pixels and the sparse pixels are arranged to form a plurality of macro pixels, and each macro pixel includes a respective subset of the color pixels and a respective subset of the sparse pixels; and
a second die positioned below and coupled to the first die, the second die including an analog-to-digital converter (ADC) array that is communicatively coupled to the sparse pixels such that each subset of the sparse pixels has a single corresponding ADC in the ADC array.

2. The sensor assembly of claim 1, further comprising:
a subdivision ADC array on the second die and positioned adjacent to the ADC array, the subdivision ADC array including a plurality of ADCs that are communicatively coupled to subdivisions of the color pixels in the pixel array,
wherein data from the subdivisions of pixels are read out on the first die and transmitted to the subdivision ADC array on the second die using one or more pathways.

3. The sensor assembly of claim 1, wherein each color channel of the one or more color channels is associated with a corresponding optical range of wavelengths, and the sparse pixels are configured to detect light over an extended optical range of wavelengths that includes each of the optical range of wavelengths of the one or more color channels.

4. The sensor assembly of claim 3, wherein the extended optical range of wavelengths further includes light in an infrared spectrum.

5. The sensor assembly of claim 1, wherein the color pixels are configured to operate in a rolling shutter mode and the sparse pixels are configured to operate in a global shutter mode.

6. The sensor assembly of claim 5, wherein the color pixels are instructed to detect light during a first exposure window such that each column of the color pixels detects light over a time range that is less than a time range of the first exposure window, and the sparse pixels are instructed to detect light during a second exposure window where each of the sparse pixels detect light over a time range that spans the second exposure window.

7. The sensor assembly of claim 6, wherein the second exposure window is centered on the first exposure window.

8. The sensor assembly of claim 7, wherein the first exposure window has a same length as the second exposure window.

9. The sensor assembly of claim 6, wherein the second exposure window begins at a same time as the first exposure window.

10. The sensor assembly of claim 6, wherein the second exposure window ends at a same time as the first exposure window.

11. The sensor assembly of claim 1, wherein the color pixels are configured to operate in a rolling shutter mode and the sparse pixels are configured to operate in an individual shutter mode.

12. The sensor assembly of claim 1, wherein the color pixels are read out via a first circuit and the sparse pixels are read out via a second circuit that is independent from the first circuit.

13. The sensor assembly of claim 1, wherein the subset of the sparse pixels is a single sparse pixel.

14. The sensor assembly of claim 1, wherein the subset of the sparse pixels includes a first sparse pixel and a second sparse pixel.

15. An imaging device comprising:
a sensor assembly including:
a first die including a pixel array composed of color pixels that detect light in one or more color channels and sparse pixels, wherein the color pixels and the sparse pixels are arranged to form a plurality of macro pixels, and each macro pixel includes a respective subset of the color pixels and a respective subset of the sparse pixels, and
a second die positioned below and coupled to the first die, the second die including an analog-to-digital converter (ADC) array that is communicatively coupled to the sparse pixels such that each subset of the sparse pixels has a single corresponding ADC in the ADC array; and
a controller configured to:
instruct the sensor assembly to capture first data describing a local area using the color pixels and to capture second data describing the local area using the sparse pixels, and
perform an action using the first data and the second data.

16. The imaging device of claim 15, wherein the sensor assembly further comprises:
a subdivision ADC array on the second die and positioned adjacent to the ADC array, the subdivision ADC array including a plurality of ADCs that are communicatively coupled to subdivisions of the color pixels in the pixel array,
wherein data from the subdivisions of pixels are read out on the first die and transmitted to the subdivision ADC array on the second die using one or more pathways.

17. The imaging device of claim 15, wherein each color channel of the one or more color channels is associated with a corresponding optical range of wavelengths, and the sparse pixels are configured to detect light over an extended optical range of wavelengths that includes each of the optical range of wavelengths of the one or more color channels.

18. The imaging device of claim 17, wherein the extended optical range of wavelengths further includes light in an infrared spectrum.

19. The imaging device of claim 15, wherein the action is one or more of: generating an image, generating a high dynamic range image, and determining depth information describing the local area.

20. A non-transitory computer-readable storage medium comprising stored instructions, the instructions when executed by a processor of an imaging device, causing the imaging device to:
capture first data describing a local area using color pixels on a sensor assembly, wherein the color pixels detect light in one or more color channels;
capture second data describing the local area using sparse pixels on the sensor assembly, wherein the sensor assembly includes:
a first die that includes a pixel array composed of the color pixels and the sparse pixels, wherein the color pixels and the sparse pixels are arranged to form a plurality of macro pixels, and each macro pixel includes a respective subset of the color pixels and a respective subset of the sparse pixels, and
a second die positioned below and coupled to the first die, the second die including an analog-to-digital converter (ADC) array that is communicatively coupled to the sparse pixels such that each subset of the one or more sparse pixels has a single corresponding ADC in the ADC array; and
perform an action using the first data and the second data.

* * * * *